United States Patent Office 3,072,658
Patented Jan. 8, 1963

3,072,658
PHENYLPIPERAZINONE DERIVATIVES
Otis E. Fancher and Shin Hayao, Elkhart, Ind., assignors to Miles Laboratories, Inc., Elkhart, Ind., a corporation of Indiana
No Drawing. Filed Dec. 27, 1960, Ser. No. 78,336
3 Claims. (Cl. 260—268)

This invention relates to novel phenylpiperazinone derivatives which have useful analgetic properties.

These compounds have the structural formula:

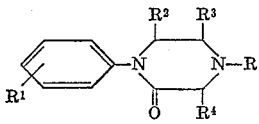

wherein R may be either alkyl or aralkyl, $R^1$ is hydrogen, hydroxyl or alkoxyl, and $R^2$, $R^3$ and $R^4$ may be hydrogen or lower alkyl.

These compounds may be conveniently prepared by acylation of the corresponding benzyl or methyl substituted ethylene diamine followed by ring closure in the presence of base and debenzylation or demethylation such as by hydrogenation or pyrolysis to give the desired phenylpiperazinone derivatives of this invention. This preparative scheme may be illustrated by the following sequence of equations in which R, $R^1$, $R^2$, $R^3$ and $R^4$ have the same significance as ascribed above, X represents Cl or Br, and $R^5$ is $CH_2C_6H_5$ or $CH_3$.

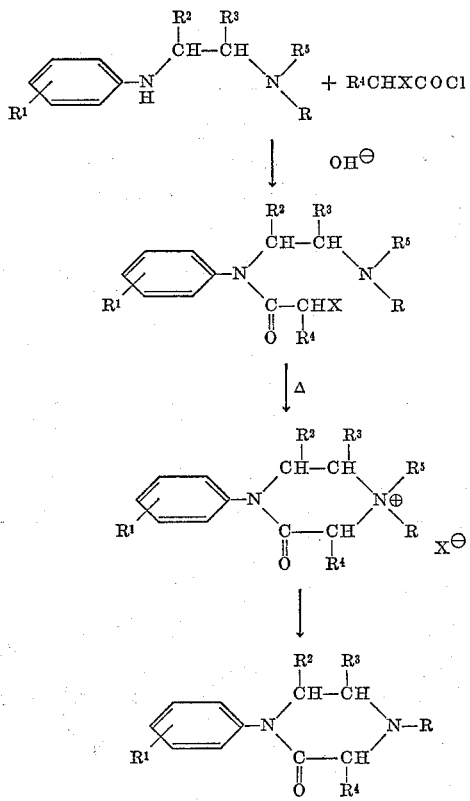

This invention may be better understood by reference to the following examples which are included for purposes of illustration and are not to be construed as in any way limiting the scope of the instant invention.

EXAMPLE I

1-Phenyl-4-Methyl-2-Piperazinone

A. *N-methyl-N-(2-anilinoethyl)benzylamine.*—A mixture of N-methyl-benzylamine (121 g., 1.0 mole) and α-chloroacetanilide (84.8 g., 0.5 mole) in 250 ml. of dry benzene was heated under reflux for 17 hours with stirring. The amine hydrochloride was removed by filtration and the benzene solution was concentrated in vacuo to leave a syrup which was dissolved in 200 ml. of tetrahydrofuran and added to a slurry of lithium aluminum hydride (28.5 g., 0.75 mole) in 350 ml. of tetrahydrofuran during a one-hour period. The reaction mixture was stirred under reflux for an additional 9 hours and let stand overnight. The excess hydride was decomposed and the crude product was distilled to give a light yellow liquid of B.P. 150–145° (0.25 mm.), yield 103.2 g. (86%).

*Anal.*—Calcd. for $C_{16}H_{20}N_2$: N (basic), 5.83. Found: N (basic), 5.84 (titration).

B. *1-benzyl-1-methyl-3-oxo-4-phenylpiperazinium chloride.*—To an ice-cold mixture of the above amine (48.0 g., 0.2 mole) in 100 ml. of benzene and 65 ml. of 20% aqueous sodium hydroxide was added with vigorous stirring a solution of chloroacetyl chloride (22.6 g., 0.2 mole) in 50 ml. of benzene during 10 minutes to give a milky solution. It was stirred for an additional 10 minutes and filtered through a layer of Celite. The benzene layer was quickly dried over anhydrous magnesium sulfate and from the clear filtrate there separated on standing at room temperature for two days 17.2 g. of a crystalline solid, M.P. 199–200°.

*Anal.*—Calcd. for $C_{18}H_{21}ClN_2O$: N, 8.85. Found: 8.85 (Kjeldahl).

After standing at room temperature for a month, the total yield of 52.5 g. (83%) was secured.

C. *1-phenyl-4-methyl-2-piperazinone maleate.*—A solution of the above piperazinium chloride (42.8 g., 0.135 mole) in 200 ml. of methanol was hydrogenated at room temperature under 50 lb. of hydrogen using 5 g. of 5% palladium on charcoal catalyst (pre-reduced). The calculated amount of hydrogen was absorbed in 10 minutes and the catalyst was removed. The filtrate was concentrated in vacuo to give a gum which was dissolved in hot water and made basic with aqueous sodium hydroxide to give a milky solution. This was extracted several times was chloroform and with ether. The combined extracts were dried and maleic acid (15.8 g., 0.136 mole) was added to precipitate a crude product of M.P. 126–129°, yield 38.5 g. (93%). It was once recrystallized from methanol-ether (norite) to give colorless prisms of M.P. 129.5–130.5°, yield 34.2 g.

*Anal.* — Calcd. for $C_{11}H_{14}N_2O \cdot C_4H_4O_4$: N, 9.15. Found: N, 9.14 (Kjeldahl).

EXAMPLE II

1-Phenyl-4-Phenethyl-2-Piperazinone

A. *N - benzyl - N - phenethyl - N' - phenyl-1,2-ethanediamine.*—A mixture of N-benzylphenethylamine (55.4 g., 0.26 mole), α-chloroacetanilide (44.5 g., 0.26 mole) and anhydrous sodium carbonate (28.6 g., 0.27 mole) in 500 ml. of isopropyl alcohol was heated under reflux with vigorous stirring for 20 hours. The inorganic salt was filtered off and the alcoholic solution was concentrated in vacuo at 90°. The residue was triturated with water and extracted with ether. The ethereal layer was separated, dried over anhydrous magnesium sulfate and evaporated in vacuo to leave a light yellow oil, yield 79.2 g. (88.5%). The crude α - (N - benzyl-N-phenethylamino)-acetanilide from two runs (115.2 g., 0.43 mole) was dissolved in 200 ml. of tetrahydrofuran and added dropwise to a slurry of lithium aluminum hydride (24.5 g., 0.645 mole) in 400 ml. of tetrahydrofuran with stirring during a 45-minute period and the resulting mixture was refluxed for 6 hours. The excess hydride was decomposed, the inorganic salt was filtered off and the solution was concentrated in vacuo. The crude amine was distilled to give a yellow liquid boiling at 141.5–147° (0.35–0.40 mm.) yield 92.7 g. (83.5%).

*Anal.*—Calcd. for $C_{17}H_{22}N_2$: N (basic), 5.52. Found: N (basic), 5.56 (titration).

B. *4 - phenyl-3-oxo-1-benzyl-1-phenethylpiperazinium chloride.*—To an ice-cold mixture of the above amine (56.8 g., 0.172 mole) in 150 ml. of benzene and 100 ml. of 20% aqueous sodium hydroxide was added with stirring a solution of chloracetyl chloride (20.0 g., 0.175 mole) in 100 ml. of benzene during a 5-minute period to give a milky solution which was stirred for another 5 minutes. The benzene layer was separated, quickly dried over anhydrous magnesium sulfate and filtered through a layer of Celite. The aqueous layer was once extracted with benzene and dried similarly. The clear benzene solution gave 5.0 g. of a crystalline solid of M.P. 133–134°, after standing over the weekend. The filtrate was heated on a steam bath overnight to give 25.6 g. of the product melting at 129–132°. The filtrate gave 11.7 g. and 3.2 g. of the solid as the third and the fourth crops. The total yield was 45.5 g. (65%). The first crop was once recrystallized from methanol-ether to give a crystalline solid of M.P. 179–179.5°, yield 3.6 g.

*Anal.*—Calcd. for $C_{25}H_{27}ClN_2O$: N, 6.89. Found: N, 6.64 (Kjeldahl).

*1-phenyl-4-phenethyl-2-piperazinone hydrochloride.*—To a solution of the piperazinium chloride (40.4 g., 0.099 mole) in 200 ml. of methanol was added 5 g. of pre-reduced palladium (5%) on charcoal and the mixture was hyrdogenated at room temperature under 50 lb. of hydrogen. The theoretical amount of hydrogen was absorbed in 2.5 hours. The catalyst was removed and the filtrate was concentrated in vacuo. Treatment of the residue with ethyl acetate gave a colorless crystalline solid, yield 22.1 g., M.P. 222–224° (d.) The filtrate was diluted with ether to give another 3.1 g. of the product melting at 222–224° (d.). Thus, the total yield was 25.2 g. (80%). The first crop was once recrystallized from methanol-ethyl acetate to give a colorless solid of M.P. 222.5–223.5° (d.), yield 23.6 g. The infrared spectrum (KBr) showed an amide carbonyl band at 5.95μ.

*Anal.*—Calcd. for $C_{18}H_{20}N_2O$: HCl, 11.53. Found, HCl 11.64 (titration).

EXAMPLE III

1-Phenyl-4,5-Dimethyl-2-Piperazinone

A. $N^1$*-phenyl-$N^2$-benzyl-$N^2$ - methyl - 1,2 - propanediamine.*—A solution of α-bromopropionanilide (82.6 g., 0.36 mole) and N-methylbenzylamine (91.0 g., 0.75 mole) in 250 ml. of dry benzene was refluxed with stirring for 22 hours. The aminehydrobromide was filtered off and the filtrate was evaporated in vacuo to leave a syrup which was triturated with water and Skelly B to give a colorless solid. The reaction mixture was cooled in an ice-water bath and the solid was collected on a filter, yield 86.7 g. (90.2%), M.P. 70–72.5°.

The above amide (115.2 g., 0.43 mole) in 200 ml. of tetrahydrofuran was added dropwise during 45 min. to a slurry of lithium aluminum hydride (24.5 g., 0.645 mole) in 400 ml. of tetrahydrofuran with stirring and the mixture was refluxed for 6 hours. Excess hydride was decomposed with 25 ml. of water, 25 ml. of 20% sodium hydroxide solution and 75 ml. of water, respectively. The salt was removed and the filtrate was freed from the solvent in vacuo to leave a liquid which was distilled to give a pure amine of B.P. 141.5–147° (0.35–0.40 mm.), yield 92.7 g. (83.5%).

*Anal.*—Calcd. for $C_{17}H_{22}N_2$:N (basic), 5.52. Found: N (basic), 5.56 (titration).

B. *1 - benzyl - 1,6 - dimethyl - 3 - oxo - 4 - phenylpiperazinium chloride.*—To an ice-cold solution of the above amine (51.0 g., 0.2 mole) in 100 ml. of benzene and 50 ml. of 20% aqueous sodium hydoxide was added with stirring a solution of chloroacetyl chloride (23.0 g., 0.24 mole) in 100 ml. of benzene during 10 min. It was then stirred for an additional 20 min. and the benzene layer was separated. The aqueous layer was extracted with benzene and with ether. The combined extracts were dried over anhydrous magnesium sulfate and the clear solution was concentrated by heating on a steam bath during 3 hours to separate a solid, yield 19.5 g., M.P. 197.5–198°.

*Anal.*—Calcd. for $C_{19}H_{23}ClN_2O$: N, 8.47. Found: N, 8.09.

The filtrate was again concentrated on a steam bath for 3 hours to give 16.8 g. of the product. The filtrate was then refluxed overnight to give another 16.2 g. of the product. Again the filtrate was refluxed for 24 hours to separate 5.7 g. of the solid. The total yield of the product was 58.2 g. (88.2%).

C. *1-phenyl-4,5-dimethyl-2-piperazinone.*—The above piperazinium chloride (38.2 g., 0.116 mole) was dissolved in a mixture of 200 ml. of ethanol and 50 ml. of water. The solution was hydrogenated with 5 g. of pre-reduced palladium catalyst (5% on charcoal) at room temperature under initial pressure of 50 lb. It absorbed calculated amounts of hydrogen in 15 min. The catalyst was removed and the solution was evaporated in vacuo to leave a light tan liquid which was treated with aqueous sodium hydroxide and the free base was extracted with ethyl acetate and with ether. The combined extracts were dried and the solvent was removed in vacuo to leave an oil which was distilled to give a pale yellow liquid of B.P. 126–135° (0.2–0.35 mm.), yield 13.4 g.

*Anal.*—Calcd. for $C_{12}H_{16}N_2O$: N (basic), 6.86. Found: N (basic), 6.70 (non-aqueous titration).

The amine (12.6 g., 0.062 mole) was dissolved in ether and anhydrous oxalic acid (5.85 g., 0.065 mole) in minimum amounts of absolute ethanol was added to give a light tan gum which gradually solidified on scratching. It was collected, washed with ether and it melted at 125–126°, yield 15.8 g.

*Anal.*—Calcd. for $C_{14}H_{18}N_2O_5$: N, 9.38.

EXAMPLE IV

1-Phenyl-3-Methyl-4-Phenethyl-2-Piperazinone

A. *1 - benzyl - 1 - phenethyl - 2 - methyl - 3 - oxo - 4 - phenylpiperazinium bromide.*—To an ice-cold solutin of N-benzyl-N-phenethyl-N'-phenyl-1,2-ethanediamine (33.3 g., 0.11 mole) in 100 ml. of benzene and 50 ml. of 20% aqueous sodium hydroxide was added a solution of 2-bromopropionyl chloride (17.6 g., 0.12 mole) in 50 ml. of benzene during 10 min. It was stirred at this temperature for an additional 10 minutes and the benzene layer was separated. The aqueous layer was extracted with ether and the combined extracts were dried over anhydrous magnesium sulfate. The clear filtrate was concentrated by heating on a steam bath for about 5 hours to separate a sticky solid, yield 14.2 g.

B. *1 - phenyl - 3 - methyl - 4 - phenethyl - 2 - piperazinone oxalate.*—The crude piperazinium bromide (24.2 g., 0.52 mole) was dissolved in 200 ml. of methanol and hydrogenated with 5 g. of 5% palladium on charcoal (pre-reduced) at room temperature under 50 lb. of hydrogen to take up enough hydrogen in 3 hrs. The catalyst was removed and the solution was evaporated at a water pump to give a syrup which was triturated with sodium hydroxide solution and the free base was extracted with chloroform. The extract was dried over anhydrous magnesium sulfate and the filtrate was concentrated in vacuo to leave a dark syrup. It was distilled to give a pale yellow viscous liquid of B.P. 200–203° (0.2 mm.), yield 11.7 g. (76.5%), λ max. 6.09μ (in chloroform) for an amide carbonyl.

*Anal.*—Calcd. for $C_{19}H_{22}N_2O$: N (basic), 4.76. Found: N (basic), 4.73 (titration).

The above free base (10.6 g., 0.036 mole) was dissolved in ether. Anhydrous oxalic acid (3.3 g., 0.037 mole) in the minimum amount of absolute ethanol was added to give a solvated oxalate. The wet cake was recrystallized once from aqueous methanol-ether to give a colorless solid, which was collected by suction and dried in vacuo, yield 10.5 g., M.P. 201–201.5° (d.).

*Anal.*—Calcd. for $C_{19}H_{22}N_2O \cdot C_2H_2O_4$: N, 7.29. Found: N, 7.27.

EXAMPLE V

1-Phenyl-4,6-Dimethyl-2-Piperazinone

A. $N^1$ - Benzyl - $N^1$ - Methyl - $N^2$ - Phenyl - 1,2 - Propanediamine.—To an ice-cold mixture of N-methylbenzylamine (60.5 g., 0.5 mole) in 350 ml. of benzene and 160 ml. of 20% sodium hydroxide solution was added with stirring a solution of 2-bromopropionyl chloride (85.8 g., 0.5 mole) in 150 ml. of benzene. After 30 min. the benzene layer was separated and the aqueous layer was once extracted with ether. The combined extracts were dried over anhydrous magnesium sulfate. To the dry benzene solution was added aniline (93 g., 1.0 mole) and the mixture was heated under reflux for 20 hrs. The aniline hydrobromide was removed by filtration and the filtrate was washed once with water and dried over anhydrous magnesium sulfate. The filtrate was concentrated in vacuo to leave a liquid. It was dissolved in 150 ml. of tetrahydrofuran and added dropwise with stirring to a slurry of lithium aluminum hydride (19 g., 0.5 mole) in 350 ml. of tetrahydrofuran. The reaction mixture was refluxed for 8 hrs. and the excess hydride was decomposed as usual. The solution was freed from the solvent in vacuo and the remaining red liquid was distilled to give a pale yellow liquid of B.P. 145–148° (0.45–1.40 mm.), yield 78.6 g. (62%).

*Anal.*—Calcd. for $C_{17}H_{22}N_2$: N (basic), 5.51. Found: N (basic), 5.52 (titration).

B. *1-phenyl-4,6-dimethyl-2-piperazinone.*—To an ice cold mixture of the above diamine (39 g., 0.15 mole) in 250 ml. of benzene and 50 ml. of 20% sodium hydroxide solution was added over a 5 min. period with stirring a solution of chloroacetyl chloride (17.0 g., 0.15 mole) in 50 ml. of benzene. The mixture was stirred for additional 10 min. and the organic layer was separated. The aqueous layer was once extracted with ether. The combined extracts were dried over anhydrous magnesium sulfate and the filtrate was heated on a steam bath to separate an oily solid. It was collected by suction and the filtrate was heated again on a steam bath. After repeating this process several times 40.1 g. (81%) of the solid was obtained. This 1-benzyl-1,5-dimethyl-3-oxo-4-phenylpiperazinium chloride (60.0 g., 0.18 mole) was dissolved in 180 ml. of water and hydrogenated with 5 g. of prereduced palladium on charcoal catalyst at room temperature under 50 lb. of initial pressure. It took up the calculated amount of hydrogen in 6 hrs. and the catalyst was removed. The aqueous solution was made alkaline and the free base was extracted with chloroform-ether. The extract was distilled to give a pale yellow liquid of B.P. 128–135° (0.45–0.65 mm.), yield 27.6 g. (75%).

*Anal.*—Calcd. for $C_{12}H_{16}N_2O$: N (basic), 6.87. Found: N (basic), 6.71 (titration).

C. *1-phenyl-4,6-dimethyl-2-piperazinone oxalate.*—1-phenyl-4,6-dimethyl-2-piperazinone (25.8 g., 0.126 mole) was dissolved in a small amount of isopropyl alcohol and 12.0 g. (0.133 mole) of anhydrous oxalic acid was added. The mixture was heated on a steam bath until it gave a clear solution which was poured into excess cold ether with stirring. The white solid was collected, washed with ether and dried in a vacuum desiccator. It was recrystallized once from methanol-ether. It melted at 84–88° (d.).

*Anal.*—Calcd. for $C_{14}H_{18}N_2O_5$: N, 9.52. Found: N, 9.80.

EXAMPLE VI

A. *1-Phenyl-4-Phenethyl-5-Methyl-2-Piperazinone*

To a solution of $N^1$-phenyl-$N^2$-benzyl-$N^2$-phenethyl-1,2-propanediamine (46.5 g., 0.135 mole) in 150 ml. of chloroform was added chloroacetyl chloride (15.2 g., 0.135 mole) to cause evolution of heat. The light amber solution was kept at room temperature overnight. The solution was evaporated to dryness in vacuo to leave a liquid which was dissolved in benzene and shaken with sodium hydroxide solution. The benzene layer was separated and dried over anhydrous magnesium sulfate. The solution was freed from the solvent in vacuo and the residue was heated in a bath at 200° for 2.5 hrs in nitrogen atmosphere to give a brown melt. It was dissolved in 200 ml. of methanol and hydrogenated with 5 g. of 5% palladium on charcoal catalyst at room temperature under 50 lb. of hydrogen to take up the calculated amount of hydrogen in 23 hrs. The catalyst was removed and the filtrate was concentrated in vacuo to leave a dark brown syrup. The combined crude product from two runs was dissolved in chloroform and shaken with sodium hydroxide solution, and dried over anhydrous magnesium sulfate. The solvent was removed in vacuo from the chloroform solution to leave a dark brown solid mass. It was distilled to give a pale yellow liquid of B.P. 190–196° (0.35–0.25 mm.), yield 57.1 g. It solidified on standing to give a light yellow solid which was once recrystallized from benzene-petroleum hexane to give a pale yellow solid of M.P. 97–99°, yield 42.9 g.

*Anal.*—Calcd. for $C_{19}H_{22}N_2O$: N (basic), 4.76. Found: N (basic), 4.70 (titration).

B. *1-Phenyl-4-Phenethyl-5-Methyl-2-Piperazinone Oxalate*

The above free base, 32.1 g. (0.109 mole), was dissolved in a mixture of ether (300 ml.) and ethyl acetate (50 ml.). A solution of anhydrous oxalic acid (9.9 g., 0.11 mole) in a minimum quantity of absolute ethanol was added to the solution to give a sticky gum which gradually solidified on scratching. The crude solid was dissolved in methanol, filtered and added to a large excess of ether to separate a light tan oil which gradually solidified to give a colorless powder of M.P. 130–132° (d.), yield 27.8 g.

*Anal.*—Calcd. for $C_{21}H_{24}N_2O_6$: N, 7.29. Found: N, 7.40.

EXAMPLE VII

This example illustrates an alternative preparation of 1-phenyl-4-phenethyl-5-methyl-2-piperazinone, the compound of Example VI. To an ice-cold solution of $N^1$-penhyl-$N^2$-phenethyl-$N^2$-methyl-1,2-propanediamine (38.3 g., 0.143 mole) in 100 ml. of benzene and 100 ml. of 20% aqueous sodium hydroxide was added with stirring a solution of chloroacetyl chloride (16.2 g., 0.143 mole) in 60 ml. of benzene during 5 min. to give a milky mixture. It was stirred at this temperature for 30 min. and the benzene layer was separated. The aqueous layer was once extracted with ether. The combined extract was dried over anhydrous magnesium sulfate, filtered and concentrated in an open flask on a steam bath. The white solid began to separate from the solution in about 15 min. It was heated on a steam bath for 16 hrs, and the solid was collected by suction, yield 28.9 g. The filtrate was again heated on a steam bath overnight to give a glassy solid. Two crops were combined and heated under vacuum to give a melt first and evolution of gas was observed. Then it was distilled to give a viscous yellow liquid of B.P. 201–199° (0.4–0.3 mm.), yield 22.0 g. It was once recrystallized from benzene-hexane to give a colorless powder of M.P. 95–100°, yield 14.3 g. A mixed M.P. with the authentic sample from Example VI (M.P. 97–99°) was undepressed (M.P. 97–100°).

In summary, this invention relates to certain phenylpiperazinone derivatives as defined by the structural formula given above which have been found to have useful analgetic properties.

What is claimed is:
1. 1-phenyl-4-methyl-2-piperazinone.
2. 1-phenyl-4,5-dimethyl-2-piperazinone.
3. 1-phenyl-4,6-dimethyl-2-piperazinone.

(References on following page)

References Cited in the file of this patent

UNITED STATES PATENTS 2,653,153     De Benneville _____ Sept. 22, 1953

OTHER REFERENCES

Bischoff et al.: Berichte Deutsche Chem. Gesell., vol. 23, pages 2026, 2031 and 2035 (1890).

Bischoff et al.: Berichte Deutsche Chem. Gesell., vol. 25, page 2931 (1892).

Karrer: Organic Chemistry, page 24, Second English Edition (1946).

Martin et al.: Jour. Amer. Chem. Soc., vol. 72, pages 4301–4302 (1950).